United States Patent [19]

Marinelli et al.

[11] Patent Number: 5,796,904
[45] Date of Patent: Aug. 18, 1998

[54] ELECTRICAL CONTINUITY INTERLOCK FOR A LASER-BASED FIBER OPTIC VEHICLE LIGHTING SYSTEM

[75] Inventors: Michael Anthony Marinelli, Northville; Jeffrey Thomas Remillard, Ypsilanti, both of Mich.; Timothy Fohl, Carlisle, Mass.

[73] Assignee: Ford Global Technologies, Inc., Dearborn, Mich.

[21] Appl. No.: 873,434

[22] Filed: Jun. 12, 1997

[51] Int. Cl.$^6$ ............................................. G02B 6/02
[52] U.S. Cl. ........................ 385/123; 385/100; 385/101
[58] Field of Search ......................... 385/123, 101, 385/100–114, 147; 174/108, 70 R, 71 R

[56] References Cited

U.S. PATENT DOCUMENTS

| | | |
|---|---|---|
| 3,766,307 | 10/1973 | Andrews, Jr. ..................... 385/101 X |
| 3,874,783 | 4/1975 | Cole. |
| 4,790,618 | 12/1988 | Abe. |
| 4,895,426 | 1/1990 | Pinson ................................ 385/101 |
| 4,994,791 | 2/1991 | Taylor. |
| 5,087,109 | 2/1992 | Ishizuka et al.. |
| 5,107,533 | 4/1992 | Jaskie. |
| 5,230,033 | 7/1993 | Soodak ................................ 385/105 |
| 5,500,911 | 3/1996 | Roff ..................................... 385/33 |

*Primary Examiner*—Phan T. H. Palmer
*Attorney, Agent, or Firm*—Steven A. Maynard

[57] ABSTRACT

A vehicle lighting system, which includes a remote light source having an interlock circuit, an optical element, and a fiber optic light guide having a coextensive electrically conductive wire, the light guide electrically coupled to the light source and optical element so that if the light guide should become disconnected or severed, the interlock circuit will prevent power from being transmitted to the remote light source.

12 Claims, 2 Drawing Sheets

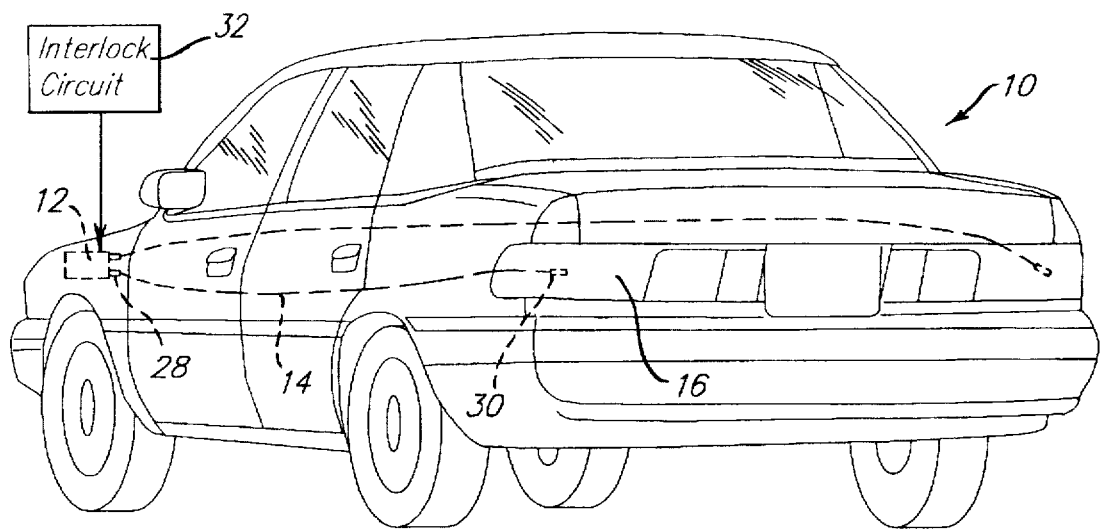
FIG. 1.
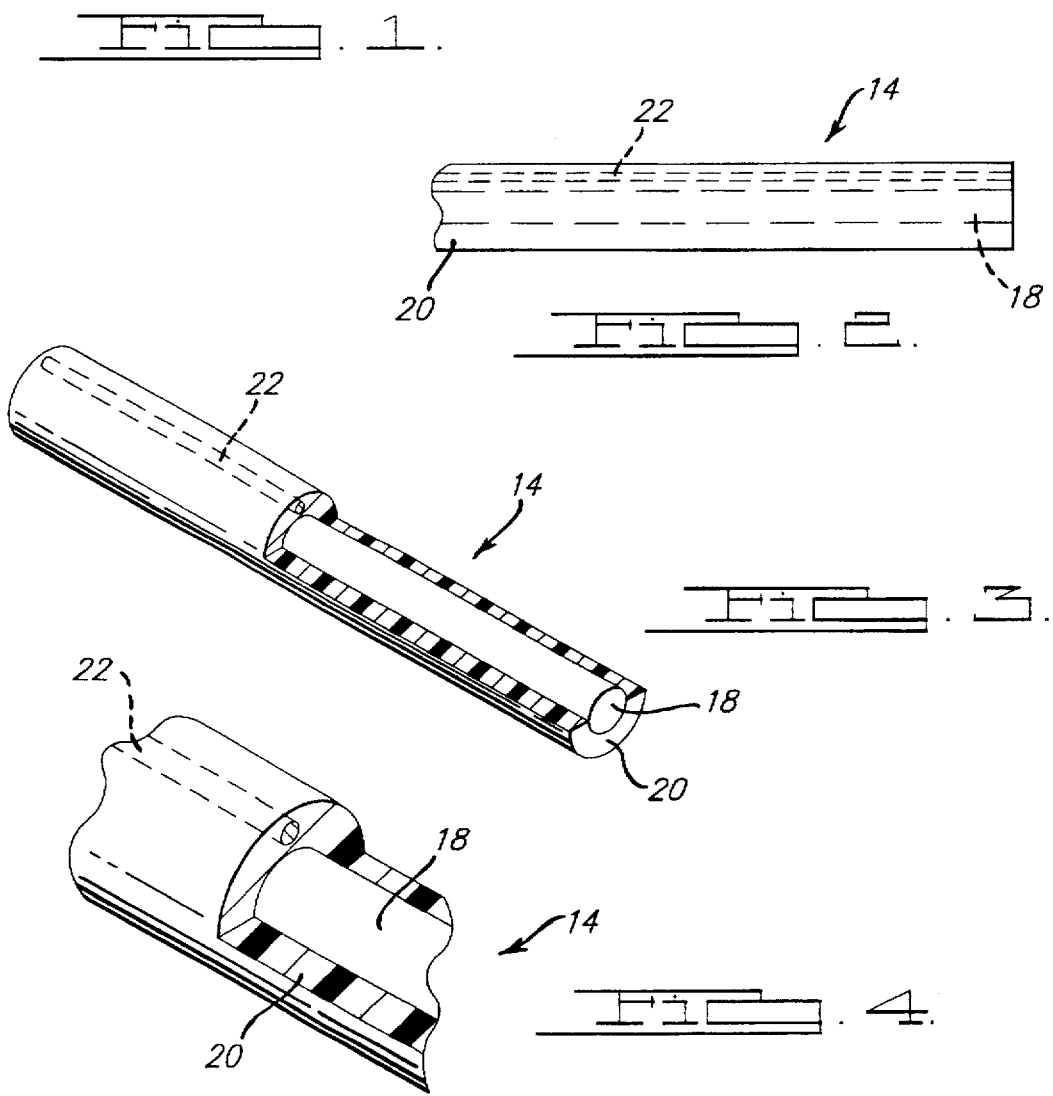
FIG. 2.
FIG. 3.
FIG. 4.

ELECTRICAL CONTINUITY INTERLOCK FOR A LASER-BASED FIBER OPTIC VEHICLE LIGHTING SYSTEM

FIELD OF THE INVENTION

The present invention relates to laser-based fiber optic vehicle lighting systems, and more specifically, to an electrical continuity interlock for such systems.

BACKGROUND OF THE INVENTION

Conventional light systems, used for vehicle head lights or tail lights, typically use a bulb and reflector system. In a bulb and reflector system, the filament of the bulb is placed at or near a focal point of a parabolic reflector. The light emitted by the bulb filament is collected by the reflector and reflected outward to form a light beam. A lens may be used to shape the light beam into a specified pattern.

The conventional bulb and reflector systems have several disadvantages. For example, bulb and reflector systems collect and reflect only thirty percent of the light emitted from the bulb filament into the useful lighting area. Additionally, thermal energy given off by the bulb during operation must be considered. The size of the reflector as well as the material used in its construction vary depending upon the amount of thermal energy generated by the bulb filament. Decreasing the size of the reflector requires use of materials with high thermal resistivity for the reflector. Further, bulb and reflector systems have disadvantages related to aerodynamics and aesthetic styling. For example, the depth of the reflector along its focal axis and the height of the reflector in directions perpendicular to the focal axis greatly limit attempts at streamlining vehicle contours.

An approach to develop an automotive lighting system directed at remedying the above disadvantages and for use with the newer streamlined vehicle contours is proposed in U.S. Pat. No. 5,434,754, assigned to the assignee of the present invention. Therein disclosed is the combination of a fiber optic light guide which transmits light from a remote light source, to a parabolic reflector, through a light manifold, and to a thin sheet optical element.

Certain advancements on such an approach have been directed at reducing the thickness of the thin sheet optical element. One way of accomplishing this reduction is by utilizing a high power remote light source. One approach is to provide a remote diode laser light source in combination with reduced diameter fiber optic light guides. U.S. application Ser. No. 08/780,034 now U.S. Pat. No. 5,700,078, assigned to the assignee of the present invention, is exemplary of such an approach.

Utilization of such an approach will necessarily require system assembly and maintenance. The fiber optic light guides will need to be connected to the remote diode laser source, the thin sheet optical element, and potentially to other light guides during assembly. Further, the fiber optic light guides may deteriorate over time or may be inadvertently severed and need to be disconnected and replaced during system maintenance.

It is therefore desirable, particularly when using diode laser remote lighting systems, to prevent exposure of laser light beyond the confines of the system, especially during system assembly or maintenance.

SUMMARY OF THE INVENTION

Responsive to the deficiencies in the prior art, the present invention provides a fiber optic light guide for a vehicle lighting system having a light transmissive core with a longitudinal axis, a first end, and a second end and an electrically conductive wire being adjacent to and axially coextensive with the longitudinal axis and terminating at the first and second ends.

According to a feature of the present invention, the fiber optic light guide further includes an outer cladding material disposed about the light guide.

According to a preferred embodiment of the present invention, the light guide is electrically continuously coupled with an optical element at the second end and a remote light source at the first end, the light source having an interlock circuit which has a first energized condition operative to power the remote light source and a second de-energized condition preventing operation of the remote light source.

An advantage of the present invention is that if the vehicle lighting system should become electrically discontinuous, the interlock circuit will switch from the first energized condition to the second de-energized condition and the remote light source will not operate, thereby preventing exposure of laser light beyond the confines of the system.

BRIEF DESCRIPTION OF THE DRAWINGS

Other features and advantages of the present invention will become apparent to those skilled in the automotive vehicle lighting arts upon reading the following description with reference to the accompanying drawings, in which:

FIG. 1 is a perspective view of an automotive vehicle having a remote light source lighting system;

FIG. 2 is a side view of a fiber optic light guide according to the present invention;

FIG. 3 is a perspective view of a fiber optic light guide according to the present invention;

FIG. 4 is a close-up view of FIG. 3 of a fiber optic light guide according to the present invention;

DETAILED DESCRIPTION OF THE PREFERRED EMBODIMENT

Figure 5:
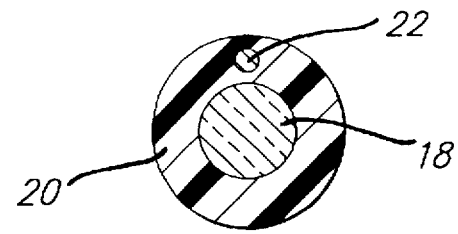
FIG. 5 is a cross-section of a fiber optic light guide according to the present invention.

Turning now to the drawings, and in particular to FIG. 1 thereof, an automotive vehicle 10 is shown having a vehicle lighting system using, in combination, a remote laser light source 12, a fiber optic light guide 14, and an optical element 16. The optical element 16 is here shown as a tail lamp. The remote laser light source 12 has a conventional interlock circuit 32.

The interlock circuit 32 has at least two conditions responsive to vehicle lighting system parameters. A first energized condition operative to power the laser light source 12, and a second deenergized condition preventing operation of the laser light source 12. As is well known, current is passed through the interlock circuit 32 in the first condition and current is blocked in the second condition.

Turning now to FIGS. 2–5, the fiber optic light guide indicated generally at 14 is illustrated as further having a light transmissive core 18, an outer cladding 20, and an electrically conductive wire 22 terminating at first and second ends, 28 and 30 respectively, of the fiber optic light guide 14. The light transmissive core 18 is composed preferably of glass fiber. An outer cladding 20 overlies and is axially coextensive with the core 18. The cladding 20 is composed preferably of a polymeric material, but may be composed of other materials without departing from the scope of the herein described invention. The electrically conductive wire 22 is preferably imbedded in the cladding 20 and is also axially coextensive with the core 18. Alternatively, the wire 22 is positioned adjacent to and axially parallel with the core 18, and the cladding 20 overlies both wire 22 and core 18.

The first end 28 of the light guide 14 is electrically coupled to the laser light source 12 and the second end 30 of the light guide 14 is electrically coupled to the optical element 16. The coupling of the system in this fashion provides an electrically continuous connection which is a preferred system parameter. When the preferred system parameter is satisfied the interlock circuit is in the first energized condition and power is directed to the laser light source 12. If the preferred system parameter is not satisfied or when there is a discontinuous electrical connection, for example if the light guide should become severed or disconnected, the interlock circuit is in the second deenergized condition preventing operation of the laser light source 12. This is advantageous because laser light will not be inadvertently released during light system assembly, maintenance, or an inadvertent severing of the light guide 14.

Figure 6:
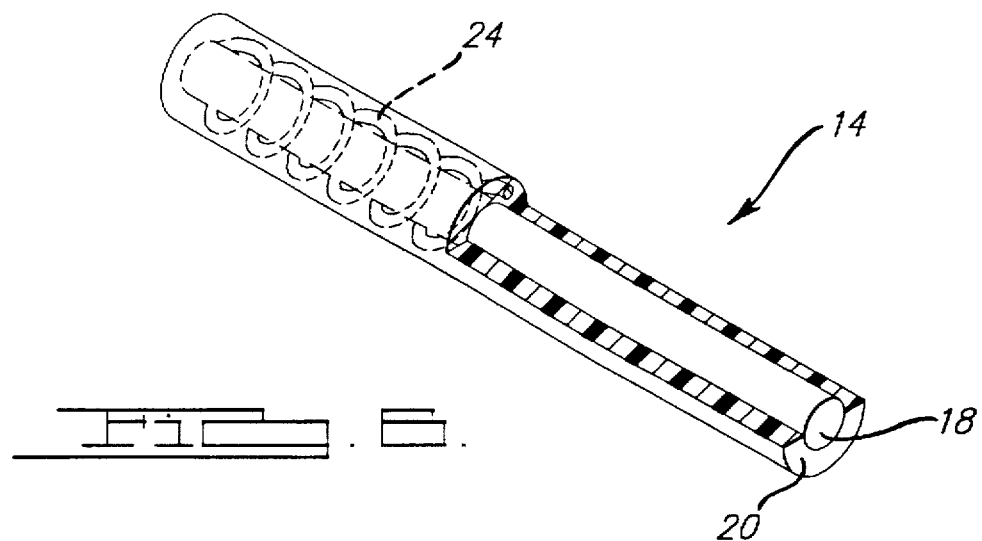
FIG. 6 is a perspective view of an alternative embodiment of the present invention.

Turning now to FIG. 6, an alternative embodiment for a fiber optic light guide 14 in which a core 18 having an overlying axially coextensive outer cladding 20 has a cladding imbedded, helically coiled, axially coextensive, electrically conductive wire 24. Alternatively, the helically coiled wire 24 is disposed adjacent to and axially coextensive with the core 18 with a cladding 20 overlay.

Figure 7:
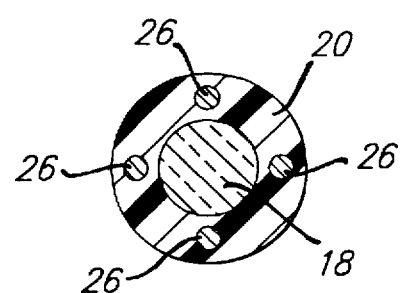
FIG. 7 is a cross-section of a still further alternative embodiment of the present invention.

Turning now to FIG. 7, a third alternative embodiment for a fiber optic light guide 14 in which a core 18 having an overlying axially coextensive outer cladding 20 has preferably four cladding imbedded, axially coextensive, electrically conductive wires 26. Each wire 26 is preferably positioned at radially equidistant intervals of substantially ninety degrees. Alternatively, the four wires 26 are disposed adjacent to and axially coextensive with the core 18 with a cladding 20 overlay. This embodiment is advantageous if the light guide 14 is cut only partially through, because the laser light source 12 will be rendered non-operational if any of the four wires 26 are cut.

Only three embodiments of an electrical continuity interlock for a vehicle lighting system of the present invention have been described. Those skilled in the automotive lighting arts will appreciate that others may be possible without departing from the scope of the following claims.

We claim:

1. A vehicle lighting system, comprising: a remote light source having an interlock circuit with a first energized condition operative to power the remote light source and a second de-energized condition preventing operation of the remote light source;

an optical element;

a fiber optic light guide having a light transmissive core with a longitudinal axis, a circumferential surface, a first end, and a second end, the first end is electrically coupled to the remote light source and the second end is electrically coupled to the optical element; and a plurality of electrically conductive wires disposed along the longitudinal axis at predetermined locations about and radially predetermined distances from the circumferential surface and terminating at the first end and the second end thereby forming an electrically continuous connection so that when there is an electrically continuous connection the first energized condition is operative and when there is an electrically discontinuous connection the second de-energized condition is operative.

2. A vehicle lighting system according to claim 1, wherein said fiber optic light guide further includes a cladding disposed about and longitudinally coextensive with the light transmissive core.

3. A vehicle lighting system according to claim 2, wherein said wires are imbedded within said cladding.

4. A vehicle lighting system according to claim 1, wherein said wires are further helically coiled about said light transmissive core.

5. A vehicle lighting system according to claim 1, wherein said plurality of wires comprises four wires.

6. A vehicle lighting system according to claim 1, wherein the predetermined locations about the circumferential surface have intervals of substantially ninety degrees.

7. A vehicle lighting system, comprising:

a remote light source having an interlock circuit with a first energized condition operative to power the remote light source and a second de-energized condition preventing operation of the remote light source;

an optical element;

a fiber optic light guide having a light transmissive core with a longitudinal axis, a first end, and a second end, the first end is electrically coupled to the remote light source and the second end is electrically coupled to the optical element; and an electrically conductive wire adjacent to and axially coextensive with the longitudinal axis and terminating at the first end and the second end thereby forming an electrically continuous connection so that when there is an electrically continuous connection the first energized condition is operative and when there is an electrically discontinuous connection the second deenergized condition is operative.

8. A vehicle lighting system according to claim 7, wherein said wire is further helically coiled about said lighting transmissive core.

9. A vehicle lighting system according to claim 8, wherein said fiber optic light guide further includes a cladding disposed about and longitudinally coextensive with the light transmissive core.

10. A vehicle lighting system according to claim 9, wherein said wire is imbedded within said cladding.

11. A vehicle lighting system according to claim 7, wherein said fiber optic light guide further includes a cladding disposed about and longitudinally coextensive with the light transmissive core.

12. A vehicle lighting system according to claim 11, wherein said wire is imbedded within said cladding.

* * * * *